US010362778B2

(12) United States Patent
O'Shea

(10) Patent No.: US 10,362,778 B2
(45) Date of Patent: Jul. 30, 2019

(54) SYSTEM AND DEVICE TO PREVENT WILDFIRE DAMAGE

(71) Applicant: John R O'Shea, Chicago, IL (US)

(72) Inventor: John R O'Shea, Chicago, IL (US)

( * ) Notice: Subject to any disclaimer, the term of this patent is extended or adjusted under 35 U.S.C. 154(b) by 0 days.

(21) Appl. No.: 15/700,939

(22) Filed: Sep. 11, 2017

(65) Prior Publication Data

US 2018/0077921 A1 Mar. 22, 2018

Related U.S. Application Data

(60) Provisional application No. 62/385,501, filed on Sep. 9, 2016.

(51) Int. Cl.
   *G01J 5/00* (2006.01)
   *A01M 29/06* (2011.01)
   *A01M 31/00* (2006.01)

(52) U.S. Cl.
   CPC .......... *A01M 29/06* (2013.01); *A01M 31/002* (2013.01); *G01J 5/0025* (2013.01)

(58) Field of Classification Search
   CPC ..... A01M 31/002; A01M 29/06; G01J 5/0025
   USPC .............................................. 116/22 A, 22 R
   See application file for complete search history.

(56) References Cited

U.S. PATENT DOCUMENTS

| | | | | |
|---|---|---|---|---|
| 2,348,250 A * | 5/1944 | Gardner | ................... | G09F 19/08 40/411 |
| 2,748,256 A * | 5/1956 | Moran | ................... | A63H 3/006 116/DIG. 9 |
| 4,656,770 A * | 4/1987 | Nuttle | ................... | A01M 29/08 116/22 A |
| 4,765,079 A * | 8/1988 | Takahashi | ............... | G09F 19/00 40/412 |
| 5,408,221 A * | 4/1995 | Carsella, Sr. | ......... | B63B 35/816 116/173 |
| 5,657,721 A * | 8/1997 | Mayfield | ............... | A01K 15/025 119/707 |
| 5,892,446 A * | 4/1999 | Reich | ..................... | A01K 15/02 119/720 |
| 6,186,857 B1 * | 2/2001 | Gazit | .................. | G09F 15/0025 40/406 |
| 6,322,230 B1 * | 11/2001 | Medici | .................... | F21S 9/022 340/321 |
| 6,385,915 B1 * | 5/2002 | Keeler | ................ | A01M 31/002 116/22 A |
| 6,428,185 B1 * | 8/2002 | Lin | .......................... | F21V 1/06 362/253 |

(Continued)

*Primary Examiner* — Justin Seo
*Assistant Examiner* — Tania C Courson
(74) *Attorney, Agent, or Firm* — Leydig, Voit & Mayer, Ltd.

(57) ABSTRACT

A wildlife damage prevention device and system are provided. The wildlife damage prevention system includes a wildlife deterrence unit and one or more sensor devices associated with the wildlife deterrence unit. The wildlife deterrence unit includes an inflatable device and a base unit. The one or more sensor devices are separate from the wildlife deterrence unit and distributed around a geographic region a user intends to protect from wildlife. The one or more sensor devices sense motion, and upon sensing motion, send a signal to a receiver at the base unit. The receiver activates a blower and/or a light also at the base unit. The blower inflates the inflatable device, and the light illuminates the inflatable device.

14 Claims, 3 Drawing Sheets

(56) References Cited

U.S. PATENT DOCUMENTS

| | | | | |
|---|---|---|---|---|
| 6,804,905 B1* | 10/2004 | Burger, III | ......... | G09F 15/0025 40/212 |
| 7,302,769 B2* | 12/2007 | Machala | ............. | G09F 15/0025 40/610 |
| 7,490,426 B2* | 2/2009 | Scarberry | ........... | G09F 15/0025 116/63 P |
| 7,690,146 B2* | 4/2010 | Jong | ..................... | A01M 29/16 116/22 A |
| 8,780,198 B2 | 7/2014 | McClure et al. | | |
| 8,800,186 B2* | 8/2014 | Zhang | ..................... | G09F 19/02 40/610 |
| 8,847,768 B2* | 9/2014 | Craven | ................. | A01M 29/16 340/573.2 |
| 8,935,988 B1* | 1/2015 | Perez | ..................... | E01F 9/688 116/63 P |
| 9,293,017 B2 | 3/2016 | McClure et al. | | |
| 9,299,231 B2 | 3/2016 | McClure et al. | | |
| 2002/0094746 A1* | 7/2002 | Harley | ................... | A63H 3/001 446/178 |
| 2005/0028720 A1* | 2/2005 | Bell | ...................... | A01M 29/06 116/22 A |
| 2005/0145162 A1* | 7/2005 | Marcus | ................. | A01M 29/06 116/22 A |
| 2006/0025037 A1* | 2/2006 | Lau | .................... | G09F 15/0025 446/226 |
| 2010/0058974 A1* | 3/2010 | Sullivan | ................ | A01M 29/06 116/22 A |
| 2012/0129420 A1* | 5/2012 | Wu | ........................ | A63H 27/10 446/220 |
| 2013/0047477 A1* | 2/2013 | Conner | .................. | G09F 19/08 40/412 |

\* cited by examiner

US 10,362,778 B2

SYSTEM AND DEVICE TO PREVENT WILDFIRE DAMAGE

CROSS-REFERENCE TO RELATED APPLICATIONS

This patent application claims the benefit of U.S. Provisional Patent Application No. 62/385,501, filed Sep. 9, 2016, which is incorporated by reference.

BACKGROUND OF THE INVENTION

Property damage caused by wildlife can be extensive. For instance, property close to a wooded area, farm fields and/or vineyards will commonly be invaded by various types of wildlife, such as deer, coyotes, raccoons, opossum, squirrels, birds and other such animals. These animals can cause a variety of damage such as grazing on plant life, such as flowers in a flower bed, or grass in the lawn. Additionally, certain animals will make burrows in and around a particular property thereby causing a variety of damage in the process.

In addition to wooded areas, property close to a water front such as a lawn, dock or shoreline is particularly susceptible to damage from birds, such as ducks, geese and other types of waterfowl. These animals may cause damage while searching for food to consume and also leave waste behind causing an unsightly mess and damaging vegetation in the area and structures such as docks.

In the past, attempts to mitigate the above discussed damage, including devices such as plastic snakes and alligators, flashing lights, string systems, and reflective balloons, have been less than effective. One potential reason these devices have been not been effective is that the wildlife become accustomed to the presence of the devices. Accordingly, what is needed is a system and device that the wildlife does not become accustomed to and therefore consistently prevents property damage.

BRIEF SUMMARY OF THE INVENTION

Embodiments of the disclosure provide a wildlife damage prevention system. The wildlife damage prevention system includes an inflatable device; a base unit coupled to the inflatable device; and one or more sensor devices associated with the base unit and configured to detect a presence of wildlife and transmit a signal to the base unit indicating the presence of wildlife. The one or more sensor devices are separate from the base unit.

Further embodiments of the disclosure provide a wildlife damage prevention system. The wildlife damage prevention system includes an inflatable deterrence unit with an inflatable device attached to a base unit. The wildlife damage prevention system further includes one or more sensor devices associated with the inflatable deterrence unit. The one or more sensor devices are separate from the inflatable deterrence unit and configured to detect a presence of wildlife and in response to detecting the presence of wildlife transmit a signal indicating the presence of wildlife to the inflatable deterrence unit.

Yet further embodiments of the disclosure provide a wildlife damage prevention system including an inflatable device, a base unit coupled to the inflatable device, and a plurality of sensor devices associated with the base unit. Each sensor device of the plurality of sensor devices are configured to detect a presence of wildlife and transmit a signal to the base unit indicating the presence of wildlife. The plurality of sensor devices is separate from the base unit.

BRIEF DESCRIPTION OF THE SEVERAL VIEWS OF THE DRAWING(S)

DETAILED DESCRIPTION OF THE INVENTION

Certain outdoor areas are particularly susceptible to damage from wildlife such as various types of birds and land based animals. For instance, lake front property, farm ground, golf courses, gardens and other similar areas can be damaged from the wildlife that enters these areas. Embodiments of the present disclosure provide a system and device to frighten away unwanted wildlife, such as birds and land based animals, by activating an inflatable device, such as what is commonly known in the industry as a "Dancing Man" inflatable device. This system and device is used to ward off or scare off birds and other animals from approaching a desired area to be protected, such as the aforementioned lake front property, farm ground, golf courses, gardens and other similar areas. In an alternate embodiment, this device and system could be utilized for entertainment purposes by energizing (turning on) the inflatable device as a person or persons approach an area protected by the device and then de-energizing (turning off) the inflatable device as the person or persons leaves the area.

Figure 1:
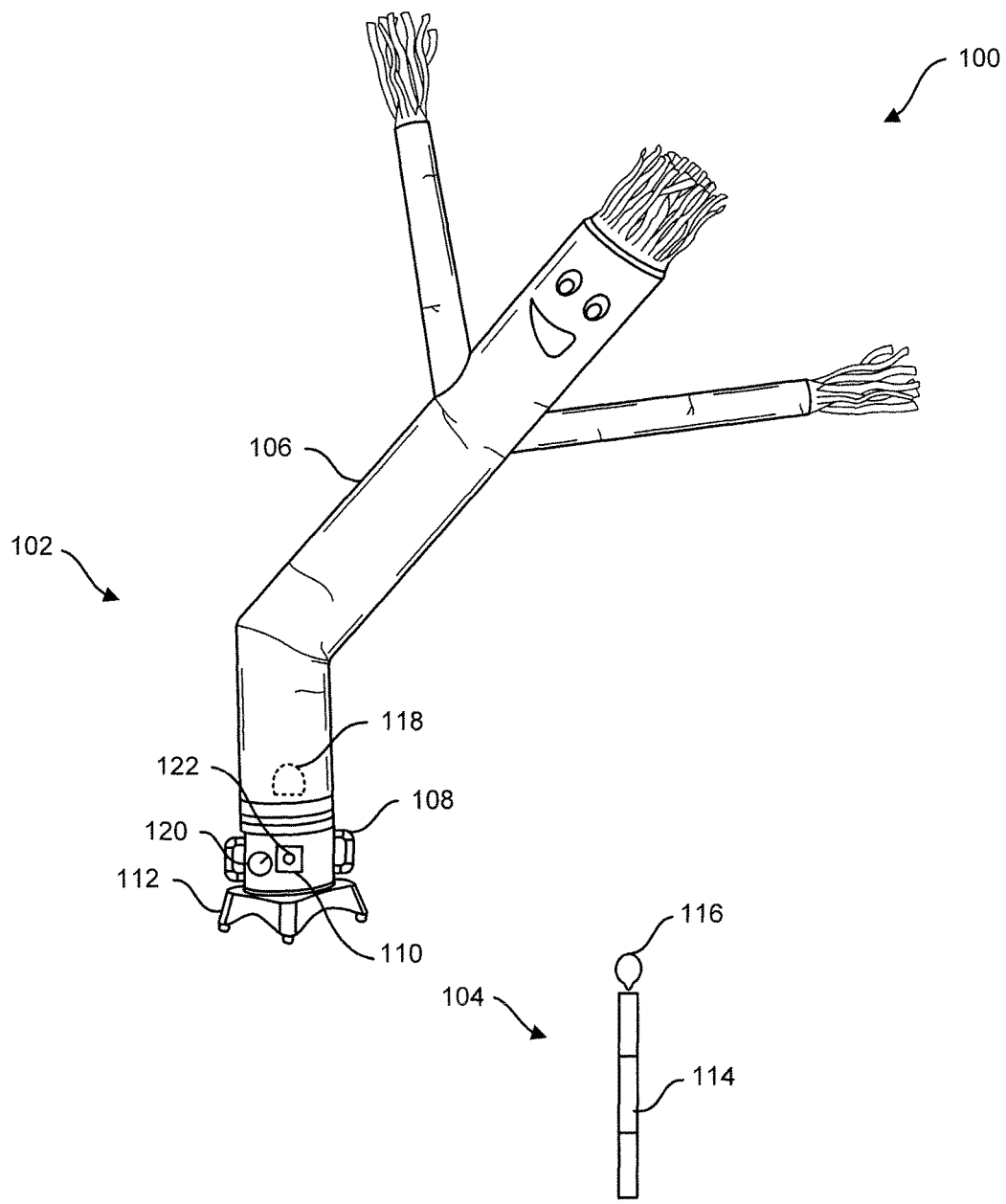
FIG. 1 illustrates an exemplary embodiment of wildlife damage prevention system in accordance with an embodiments of the disclosure.

Turning now to the figures, illustrated in FIG. 1 is an exemplary embodiment of a wildlife damage prevention system 100. Wildlife damage prevention system 100 includes an inflatable deterrence unit 102 and at least one sensor device 104. The inflatable deterrence unit 102 includes an inflatable device 106 and a base unit 108. In the illustrated embodiment, the inflatable device 106 is a "Dancing Man." However, in other embodiments, the inflatable device 106 may take various other shapes and forms. In at least one embodiment, the inflatable device 106 is on the order of six feet tall, although inflatable devices 106 of greater or lesser height may be utilized.

Regarding the base unit 108, it attaches to the inflatable device 106 thereby anchoring the inflatable device 106 in position. The base unit 108 further includes a receiver 110 and a blower 112, which in certain embodiments is a fan. The blower 112 is in fluid communication with the inflatable device 106 such that when the blower is activated it inflates the inflatable device 106. The receiver 110 activates the blower 112 upon receiving a signal indicating the presence of wildlife from the sensor device 104.

Regarding the sensor device 104, it is separate from the inflatable deterrence unit 102 and configured to transmit the signal indicating the presence of wildlife to the receiver 110 of the base unit 108. That is, the sensor device 104 is physically spaced from the inflatable deterrence unit 102 in placement for operation. Those of skill in the art will appreciate that spacing the sensor device 104 a geographic distance from the base unit 102 provides a user maximum flexibility to tailor the wildlife damage prevention system 100 to the geographic terrain. For example, the remote spacing of the sensor device 104 allows the user to account not only for planar shape of the area to be protected, but also for physical changes in altitude, such as hills. By way of further example, in some embodiments, the sensor device 104 may be physically located above the water line within a waterway.

In certain embodiments the sensor device 104 is a passive infrared sensor that detects motion within a vicinity of the sensor device 104. However, in other embodiments, the sensor device 104 may include an electromagnetic detection circuit, and in yet other embodiments, the sensor device 104 may have a wired connection to the receiver 110. For example, in at least one embodiment, the sensor has a thirty-six foot maximum range over a 110° angle.

Further, in certain embodiments, the sensor device 104 is paired with the receiver 110 of the base unit 108 such that a signal from the sensor device 104 is known and trusted by the receiver 110. In a typical use environment, the sensor device 104 is placed within a certain geographic distance from the inflatable deterrence unit 102 so when wildlife approaches an area monitored by the sensor device 104, the signal indicating the presence of wildlife will be sent to the receiver 110. In a particular embodiment, the sensor device 104 includes a mast 114 with a wireless motion sensor 116 disposed on one end of the mast 114. The other end of the mast 114 may be embedded in the ground within the vicinity of the inflatable deterrence unit 102.

In certain embodiments, the wildlife prevention system 100 may include more than one sensor device 104 associated with a single inflatable deterrence unit 102. In this embodiment, the multiple sensor devices 104 may be distributed within the geographic area surrounding the inflatable deterrence unit 102. In this manner, the multiple sensor devices 104 can be configured to form a protected area such that once wildlife enters the protected area, the signal will be transmitted from the sensor device 104 to the receiver 110 to turn on blower 112.

In the embodiment illustrated in FIG. 1, the base unit 108 further includes a light 118, which in certain embodiments is a strobe light. The light 118 functions similar to the blower 110 in that the light 118 also turns on upon the receiver 110 receiving the signal from the sensor device 104.

In certain embodiments, the base unit 108 further includes a timer 120. The timer 120 is activated once the blower 112 and/or the light 118 is turned on, and upon expiration of the timer 120, the blower 112 and/or light 118 shuts down. The length of time provided by the timer 120 is adjustable such that the blower 112 and/or the light 118 may run for longer or shorter periods of time. Those of skill in the art will appreciate that the timer 120 may be of any appropriate design, and disposed at any appropriate position within the system. For example, while the timer 120 is illustrated as associated directly with the base unit 108 in FIG. 1. The timer may be associated with the sensor device 104, for example.

Additionally, in certain embodiments, the receiver 108 includes one or more switches 122 that when actuated turn on the blower 110 and/or the light 118. In this manner, the inflatable deterrence unit 102 can be in constant controlled operation.

Figure 2:
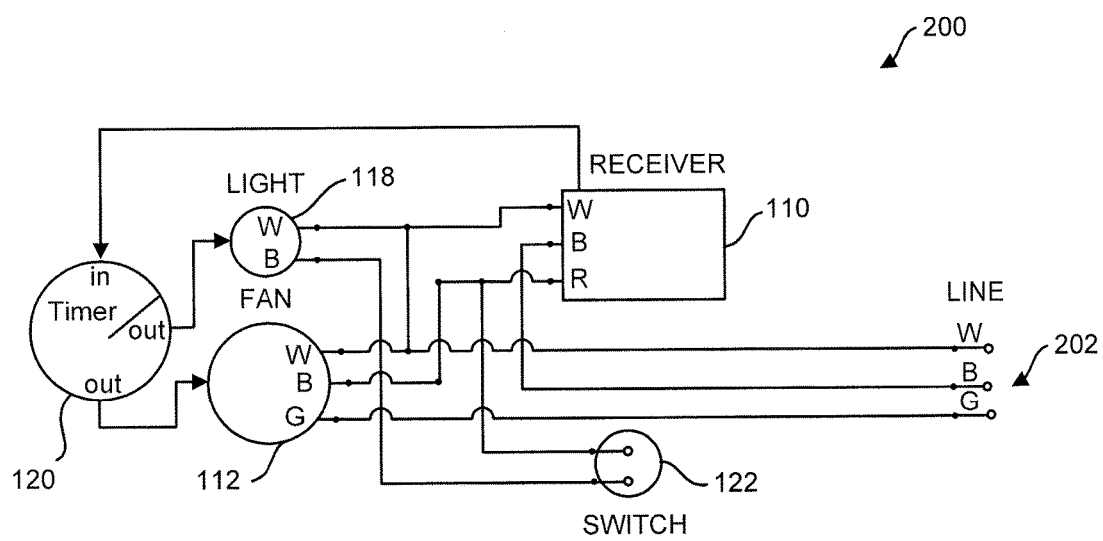
FIG. 2 illustrates a schematic wiring diagram of a base unit of the wildlife damage prevention system in accordance with an embodiment of the disclosure.

Turning now to FIG. 2, an exemplary embodiment of a detection circuit 200 is illustrated. In certain embodiments, the detection circuit 200 is included as part of the wildlife deterrence unit 102 (see FIG. 1). As illustrated, detection circuit 200 includes the receiver 110, which is coupled to the light 118, the blower 112 (in the form of a fan), the switch 122 and a power line 202. In the illustrated embodiment, the power line 202 indicates that the detection circuit 200 is powered externally such as from a wall outlet. However, in other embodiments, the detection circuit 200 is powered by a battery. In operation, the receiver 110 of the detection circuit 200 receives a signal from an external device, such as the sensor device 104 (see FIG. 1), and turns on the light 118 and the blower 112. Further, in certain embodiments, a timer 120 is included in the detection circuit 200. As described above, the timer 120 is adjustable so to configure an amount of time the blower 112 and/or the light 118 are active after they are activated by the receiver 110.

An exemplary use condition in accordance with one embodiment of the disclosure would be a wildlife deterrence unit 102 and eight sensor devices 104. A user distributes the eight sensor devices 104 in a geographic region the user intends to protect from wildlife. In this configuration, once one or more of the sensor devices 104 detect motion within the protected geographic region, that sensor device 104 transmits a signal to the receiver 110 at the base unit 108 of the wildlife deterrence unit 102. The receiver 110 then turns on one or more of the blower 112 and/or the light 118. The blower 112 inflates the inflatable device 106, and the light 118 illuminates the inflatable device 106. The movement and light of the inflatable device 106 will startle the wildlife causing it to flee the protected area. In this manner, the protected area will not suffer the typical damage caused by certain types of wildlife.

Figure 3:
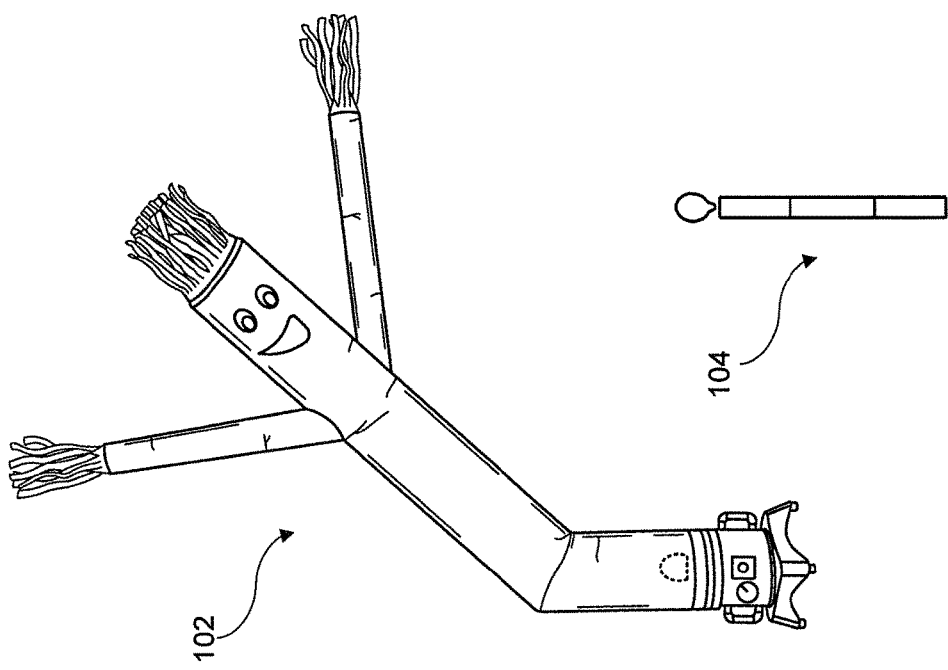
FIG. 3 illustrates a wildlife damage prevention system in accordance with an alternate embodiment of the disclosure.
Figure 3:
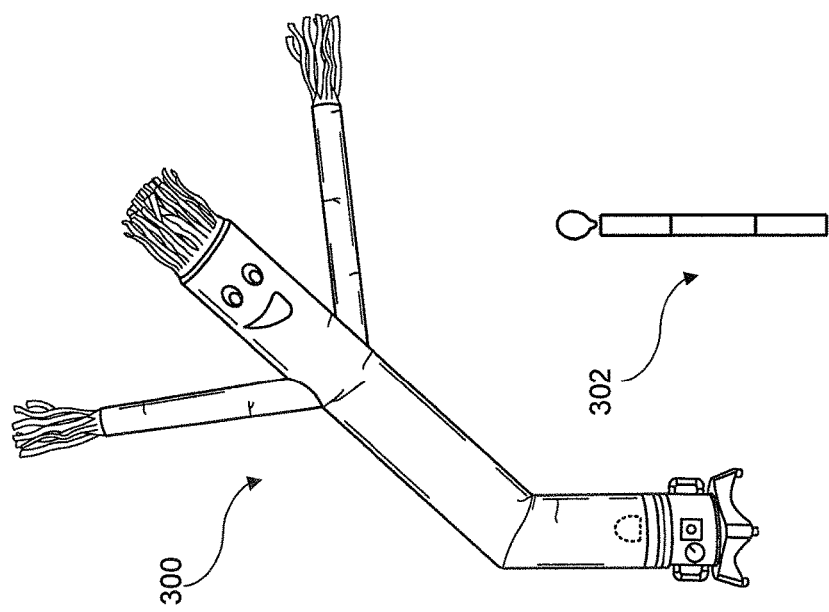

In other exemplary use conditions, more than one wildlife deterrence unit 102 with additional sensor devices may be deployed (see 300, 302 in FIG. 3). In this manner, larger geographic areas may be protected from damage by wildlife.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A wildlife damage prevention system comprising:
   an inflatable device;
   a base unit coupled to and disposed below the inflatable device, the base unit including a light disposed and configured to selectively internally illuminate the inflatable device; and
   one or more sensor devices associated with the base unit and configured to detect a presence of wildlife and transmit a signal to the base unit indicating the presence of wildlife, the one or more sensor devices are separate from the base unit, base unit being configured to inflate the inflatable device and to turn on the light to internally illuminate the inflatable device to scare off wildlife upon receiving the signal indicating the presence of wildlife,
   wherein the one or more sensor devices are spatially distributed within a geographic vicinity of the inflatable device and the base unit.

2. The wildlife prevention system of claim 1, wherein the base unit comprises a receiver configured to receive the signal transmitted from the one or more sensor devices indicating the presence of wildlife.

3. The wildlife prevention system of claim 2, wherein the base unit further comprises a blower in fluid communication with the inflatable device and upon receiving the signal transmitted from the one or more sensor devices, the blower inflates the inflatable device.

4. The wildlife prevention system of claim 1, wherein the light is a strobe light.

5. The wildlife prevention system of claim 1, wherein the one or more sensor devices are passive infrared sensors.

6. A wildlife damage prevention system comprising:
   an inflatable deterrence unit comprising an inflatable device attached to a base unit disposed below the inflatable device, the base unit including a light disposed and configured to selectively internally illuminate the inflatable device; and
   one or more sensor devices associated with the inflatable deterrence unit, the one or more sensor devices are separate from the inflatable deterrence unit and configured to detect a presence of wildlife and in response to detecting the presence of wildlife transmit a signal indicating the presence of wildlife to the inflatable deterrence unit, base unit being configured to inflate the inflatable device and to turn on the light to internally illuminate the inflatable device to scare off wildlife upon receiving the signal indicating the presence of wildlife,
   wherein the one or more sensor devices are spatially distributed within a geographic vicinity of the inflatable device and the base unit.

7. The wildlife damage prevention system of claim 6, wherein the base unit comprises a receiver configured to receive the signal indicating the presence of wildlife.

8. The wildlife damage prevention system of claim 7, wherein the base unit further comprises a blower in fluid communication with the inflatable device and upon receiving the signal indicating the presence of wildlife at the receiver, the blower inflates the inflatable device.

9. The wildlife damage prevention system of claim 6, further comprising:
   a second inflatable deterrence unit comprising a second inflatable device attached to a second base unit; and
   one or more additional sensor devices associated with the second inflatable deterrence unit, the one or more additional sensor devices are separate from the second inflatable deterrence unit and configured to detect a presence of wildlife and in response to detecting the presence of wildlife transmit a second signal indicating the presence of wildlife to the second inflatable deterrence unit.

10. A wildlife damage prevention system comprising:
    an inflatable device;
    a base unit coupled to and disposed below the inflatable device, the base unit including a light disposed and configured to selectively internally illuminate the inflatable device; and
    a plurality of sensor devices associated with the base unit and each sensor device of the plurality of sensor devices are configured to detect a presence of wildlife and transmit a signal to the base unit indicating the presence of wildlife, the plurality of sensor devices are separate from the base unit, base unit being configured to inflate the inflatable device and to turn on the light to internally illuminate the inflatable device to scare off wildlife upon receiving the signal indicating the presence of wildlife,
    wherein the plurality of sensor devices are spatially distributed within a geographic vicinity of the inflatable device and the base unit.

11. The wildlife damage prevention system of claim 10, wherein the base unit comprises a receiver configured to receive the signal.

12. The wildlife damage prevention system of claim 11, wherein the base unit further comprises a blower in fluid communication with the inflatable device and upon receiving the signal, the blower inflates the inflatable device.

13. The wildlife damage prevention system of claim 10, wherein the light is a strobe light.

14. The wildlife damage prevention system of claim 10, wherein the plurality of sensor devices are passive infrared sensors.

* * * * *